(12) United States Patent
Choi

(10) Patent No.: US 11,585,129 B2
(45) Date of Patent: Feb. 21, 2023

(54) B-PILLARLESS OPPOSITE SLIDING DOOR

(71) Applicants: Hyundai Motor Company, Seoul (KR); Kia Motors Corporation, Seoul (KR)

(72) Inventor: Je-Won Choi, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 919 days.

(21) Appl. No.: 16/415,400

(22) Filed: May 17, 2019

(65) Prior Publication Data
US 2020/0284071 A1    Sep. 10, 2020

(30) Foreign Application Priority Data
Mar. 8, 2019    (KR) .................. 10-2019-0027004

(51) Int. Cl.
| | | |
|---|---|---|
| *E05B 83/40* | (2014.01) | |
| *E05B 77/02* | (2014.01) | |
| *B60J 5/06* | (2006.01) | |
| *E05B 85/04* | (2014.01) | |
| *E05B 85/22* | (2014.01) | |
| *E05B 81/18* | (2014.01) | |
| *B60J 5/04* | (2006.01) | |

(52) U.S. Cl.
CPC .............. *E05B 83/40* (2013.01); *B60J 5/042* (2013.01); *B60J 5/0479* (2013.01); *B60J 5/06* (2013.01); *E05B 77/02* (2013.01); *E05B 81/18* (2013.01); *E05B 85/04* (2013.01); *E05B 85/22* (2013.01)

(58) Field of Classification Search
CPC ... B60J 5/042; B60J 5/0479; B60J 5/06; B60J 5/0477; B60J 2005/0475; E05B 83/40; E05B 77/02; E05B 81/18; E05B 85/04; E05B 85/22
USPC ............................................ 296/155, 187.12
See application file for complete search history.

(56) References Cited

U.S. PATENT DOCUMENTS

| | | | | |
|---|---|---|---|---|
| 5,140,316 A | * | 8/1992 | DeLand | .................. E05B 77/48 340/12.5 |
| 5,522,357 A | | 6/1996 | Nogi et al. | |
| 5,752,737 A | * | 5/1998 | Heldt | ....................... B60J 5/043 292/DIG. 67 |
| 6,312,045 B2 | * | 11/2001 | Kitagawa | ............... B62D 25/04 292/25 |
| 6,332,641 B1 | * | 12/2001 | Okana | ..................... B60J 5/043 296/210 |
| 6,382,705 B1 | * | 5/2002 | Lang | ......................... B60J 5/06 49/248 |

(Continued)

FOREIGN PATENT DOCUMENTS

| | | |
|---|---|---|
| KR | 100204626 B1 | 6/1999 |
| KR | 100451977 B1 | 10/2004 |
| KR | 101760412 B1 | 7/2017 |

*Primary Examiner* — Joseph D. Pape
*Assistant Examiner* — Veronica M Shull
(74) *Attorney, Agent, or Firm* — Slater Matsil, LLP

(57) ABSTRACT

Embodiments provide a B-pillarless opposite sliding door in which a hook fastening means is used instead of an upper latch to be installed at an upper end of the B pillarless opposite sliding door. An upper end of a door B-pillar beam, which serves to support a B-pillar, can fastened to a roof part of a vehicle body to ensure a ceiling strength performance when the hook fastening means is applied.

14 Claims, 7 Drawing Sheets

(56) References Cited

U.S. PATENT DOCUMENTS

| | | | | |
|---|---|---|---|---|
| 7,320,495 | B2* | 1/2008 | Menke | B60J 5/0479 |
| | | | | 296/146.1 |
| 7,819,465 | B2* | 10/2010 | Elliott | B62D 25/04 |
| | | | | 296/202 |
| 2002/0067111 | A1 | 6/2002 | Shibata et al. | |
| 2012/0049581 | A1* | 3/2012 | Konchan | B60J 5/0479 |
| | | | | 292/341.15 |
| 2016/0053733 | A1 | 2/2016 | Aochi et al. | |

* cited by examiner

DOOR-CLOSED STATE

DOOR IS SLIGHTLY DEFORMED AND MOVED INWARD

B-PILLARLESS OPPOSITE SLIDING DOOR

CROSS-REFERENCE TO RELATED APPLICATIONS

This application claims priority under 35 U.S.C. § 119 to Korean Patent Application No. 10-2019-0027004, filed on Mar. 8, 2019, in the Korean Intellectual Property Office, the disclosure of which is incorporated herein by reference in its entirety.

TECHNICAL FIELD

The present invention relates to a B-pillarless opposite sliding door.

BACKGROUND

In general, a vehicle has an occupant compartment having a predetermined size in which a driver or an accompanied occupant may be seated, and occupant compartment opening/closing doors are installed on a vehicle body to open or close the occupant compartment.

In the case of a passenger vehicle, the occupant compartment opening/closing doors include a front door installed at a front side in a longitudinal direction of the vehicle and a rear door installed at a rear side in the longitudinal direction of the vehicle. The front door and the rear door are typically installed on the vehicle body so as to be rotatable by means of hinges.

Meanwhile, in the case of a van in which many persons may be seated, the occupant compartment opening/closing doors slide forward and rearward in the longitudinal direction of the vehicle to open or close the occupant compartment.

In the case of the slide type occupant compartment opening/closing door for a van, the occupant compartment opening/closing door is configured to move rearward in the longitudinal direction of the vehicle to open the occupant compartment, and move forward in the longitudinal direction of the vehicle to close the occupant compartment. Therefore, the slide type occupant compartment opening/closing door has an advantage in that a space required to open or close the door is smaller in the slide type occupant compartment opening/closing door than in the hinged occupant compartment opening/closing door applied to the passenger vehicle and a door opening formed in the vehicle body may be completely opened even though the space required to open or close the door is small.

However, the slide type occupant compartment opening/closing door in the related art requires three support/guide rails for supporting an upper portion, a middle portion, and a lower portion of the door during a process of opening or closing the door and requires components related to the support/guide rails, and as a result, there is a problem in that a weight of the vehicle and the number of components are increased and a degree of design freedom of the vehicle deteriorates.

The above-mentioned problem causes the following problems.

First, a curved roof part cannot be designed because an upper rail positioned at an upper portion, that is, a straight upper rail is applied to a roof part.

This causes a problem of deterioration in an external appearance because of a curved side outer opening caused by applying a latch.

Second, because a center rail positioned at the middle portion is also designed to have a straight shape, it is necessary to increase a size of a fender, there is a limitation in designing a head lamp connecting portion, and marketability deteriorates because a fender portion rail is exposed.

Third, because the opening is shifted toward the interior of the vehicle, there is concern that a passenger's head may be injured as the passenger's head collides with an upper trim when the passenger is seated in the vehicle.

The following documents include subject matter related to the subject matter disclosed herein: 1. Korean Patent No. 10-1760412 (Jul. 17, 2017); Korean Patent No. 10-0204626 (Mar. 29, 1999; and Korean Patent Application Laid-Open No. 10-0451977 (Sep. 30, 2004).

SUMMARY

The present invention relates to a B-pillarless opposite sliding door. Particular embodiments of the present invention relate to a B-pillarless opposite sliding door in which no separate latch space is needed because a hook fastening structure is applied instead of an upper latch of an upper part, and an opening flange of a vehicle body may be formed in a straight and uniform shape because a door panel does not protrude unlike the related art.

Embodiments of the invention can provide a B-pillarless opposite sliding door in which a hook fastening structure is applied instead of an upper latch of an upper part in order to solve the problem occurring due to the application of the upper latch, such that an opening flange of a vehicle body may be formed in a straight and uniform shape because no latch space is needed and a door panel does not protrude.

An exemplary embodiment of the present invention provides a B-pillarless opposite sliding door in which a hook fastener is used instead of an upper latch to be installed at an upper end of the B pillarless opposite sliding door. An upper end of a door B-pillar beam, which serves to support a B-pillar, is fastened to a roof part of a vehicle body to ensure a ceiling strength performance when the hook fastener is applied. The hook fastener includes a hook that is installed at the roof part of the vehicle body, a hook support portion that is formed at an upper end of the B-pillar beam so that the hook is caught by or released from the hook support portion, and a hook catching portion that protrudes from an upper portion of the hook support portion so that the hook is caught by the hook catching portion.

The hook may be configured to support door B-pillar rigidity by being fastened to an outer reinforcement and a B-pillar beam compressing portion as the door is deformed and moved inward due to an external impact load such as a collision, or the hook may be configured to support door B-pillar rigidity by being fastened by a hook catching structure of an inner reinforcement as the door is slightly deformed and moved outward due to an internal load such as deviation strength and frame rigidity.

The hook may be automatically retracted or extended by a hook retracting/extending mechanism. The hook may be exposed when the sliding door is closed such that the hook may remain exposed while the sliding door is closed, and the hook may be inserted into a side outer portion as the sliding door is opened.

It is possible to obtain the following effects from the B-pillarless opposite sliding door according to the present invention having the above-mentioned configuration.

First, because an upper end opening of a B-pillar is straight and uniform, aesthetic external appearances and marketability are ensured.

Second, because an inner curved portion of the upper end opening of the B-pillar is eliminated, it is possible to solve a problem caused when a passenger's head is caught and injured when the passenger gets in or out of the vehicle.

Third, because a hook fastening structure, which is substituted for an upper end latch of the B-pillar, is applied, it is possible to maintain a rigidity performance at a level equal to a level of a collision and deviation strength.

Fourth, because the hook is in a non-exposure mode when the sliding door is opened, aesthetic external appearances and marketability are improved.

BRIEF DESCRIPTION OF THE DRAWINGS

FIG. 2 or 3 is a view made by extracting only a hook fastener according to the present invention, in which FIG. 2 is a view illustrating a state in which a hook is fastened to a hook support portion and a catching portion, and FIG. 3 is a view illustrating a state in which the hook support portion and the catching portion are formed at an upper end of a door B-pillar beam.

FIG. 4, are views illustrating a state in which the hook fastener is installed on a B-pillarless opposite sliding door according to the present invention.

FIGS. 8A and 8B are views illustrating a state in which the hook is retracted and extended by the hook retracting/extending mechanism according to the present invention, in which FIG. 8A is a view illustrating a state in which the hook is exposed, and FIG. 8B is a view illustrating a state in which the hook is inserted toward a roof part.

DETAILED DESCRIPTION OF ILLUSTRATIVE EMBODIMENTS

Figure 1:
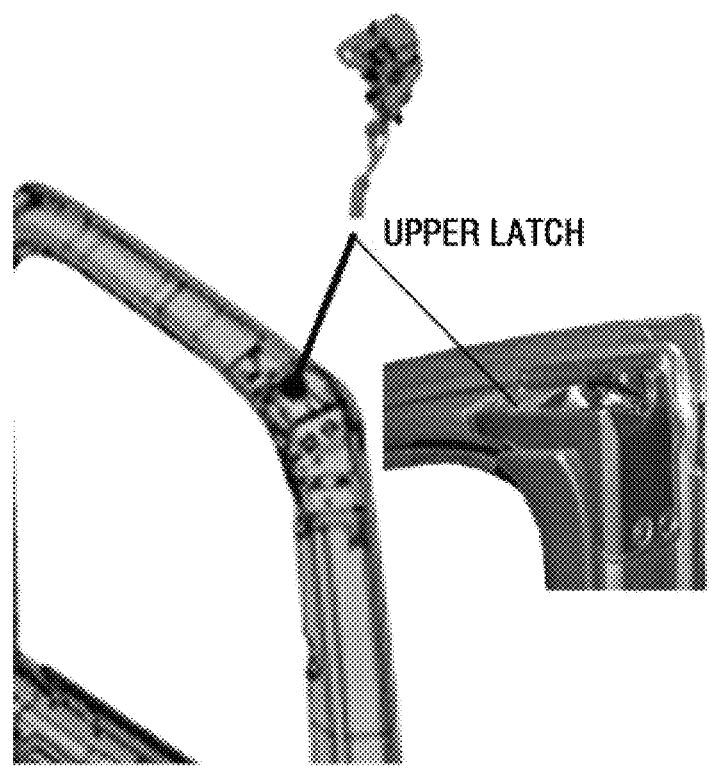
FIG. 1 is a view illustrating a state in which an upper latch is installed on a sliding door in the related art.

Hereinafter, the present invention will be described in detail with reference to the accompanying drawings so that those skilled in the technical field to which the present invention pertains may easily carry out the present invention. However, the present invention may be implemented in various different ways, and is not limited to the exemplary embodiments described herein.

A part irrelevant to the description will be omitted to clearly describe the present invention, and the same or similar constituent elements will be designated by the same reference numerals throughout the specification.

Terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Hereinafter, an exemplary embodiment according to the present invention will be described in detail with reference to the accompanying drawings.

Figure 2:
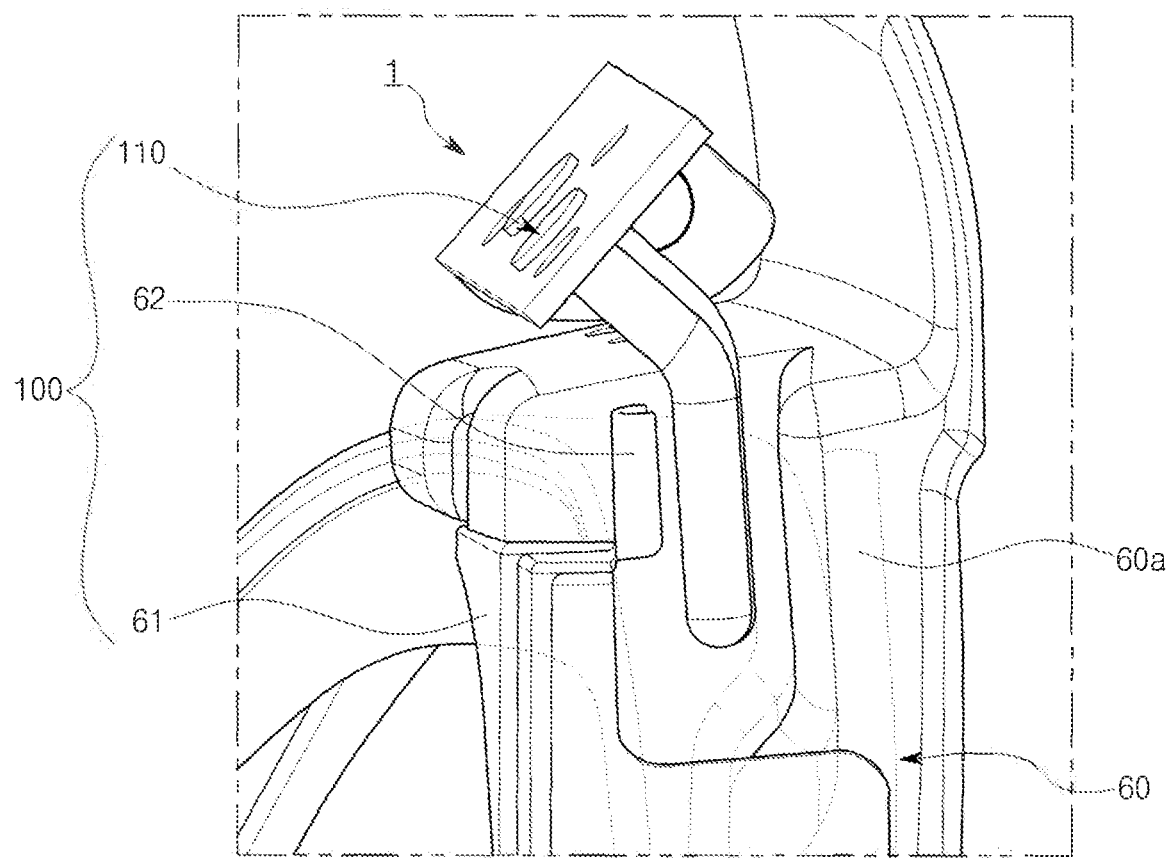

As illustrated in FIG. 2, the present invention broadly includes a hook no, a hook support portion 61 which supports the hook no, and a hook catching portion 62 to which the hook no is fastened, the hook no, the hook support portion 61 and the hook catching portion constituting a hook fastener 100.

In the present invention, because the hook fastener 100, instead of an upper latch used in the related art, is installed at an upper end of a pillarless opposite sliding door 1, a space for installing the upper latch in the related art as illustrated in FIG. 1 is not needed, and an opening flange of a vehicle body may be formed in a straight and uniform shape because a door panel does not protrude.

An upper end of a door B-pillar beam 60, which serves to support a B-pillar, is fastened to a roof part of the vehicle body by the hook no in order to ensure a ceiling strength performance when the hook fastener 100 is applied.

The configuration is to support an external impact load in the event of a broadside collision, support a load from an interior caused by deviation strength, or ensure frame rigidity.

Figure 3:
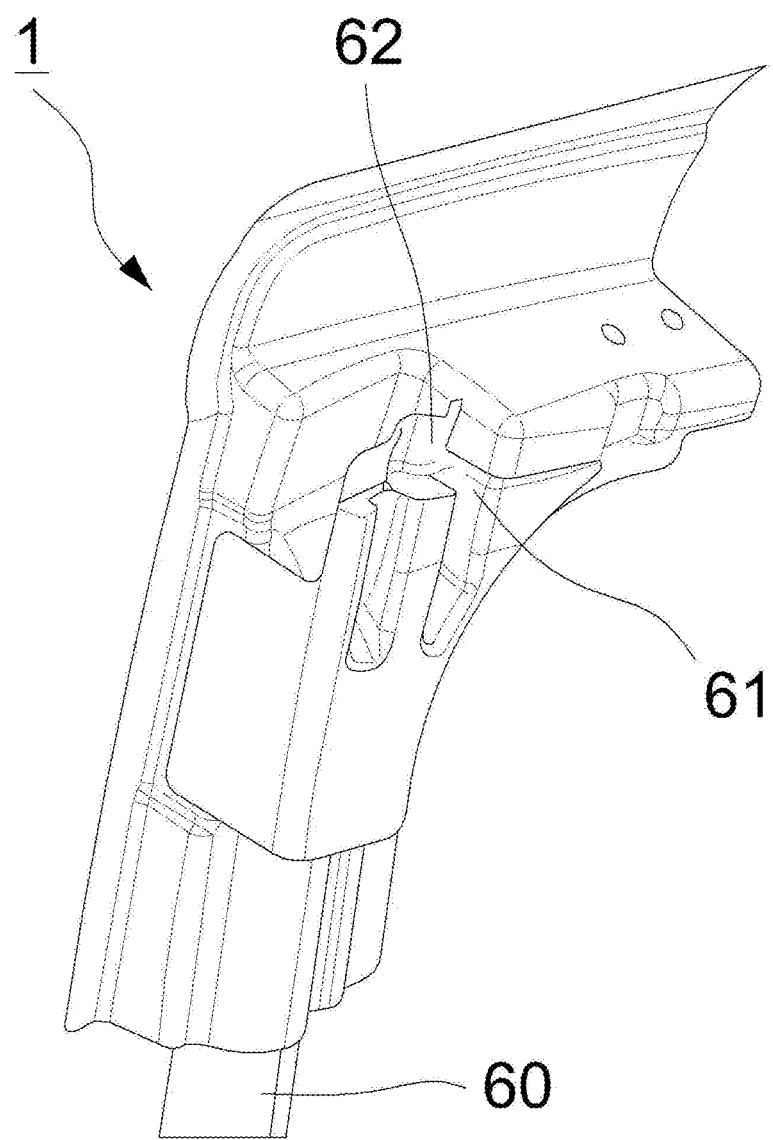

In more detail, as illustrated in FIG. 2 or 3, the hook fastener 100 includes the hook no which is installed at a side outer portion 10, the hook support portion 61 which is formed at the upper end of the B-pillar beam 60 so that the hook no is caught by or released from the hook support portion 61, and the hook catching portion 62 which protrudes from an upper portion of the hook support portion 61 so that the hook no is caught by the hook catching portion 62.

Figure 4A:
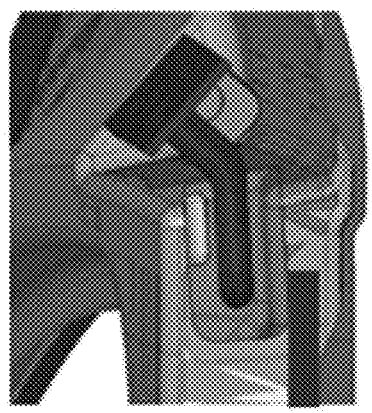
FIGS. 4A and 4B, collectively
Figure 4B:
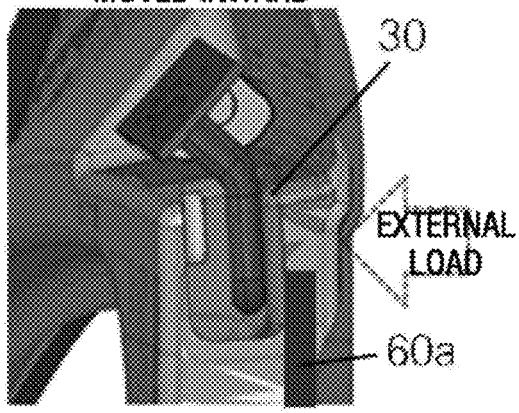
Figure 5:
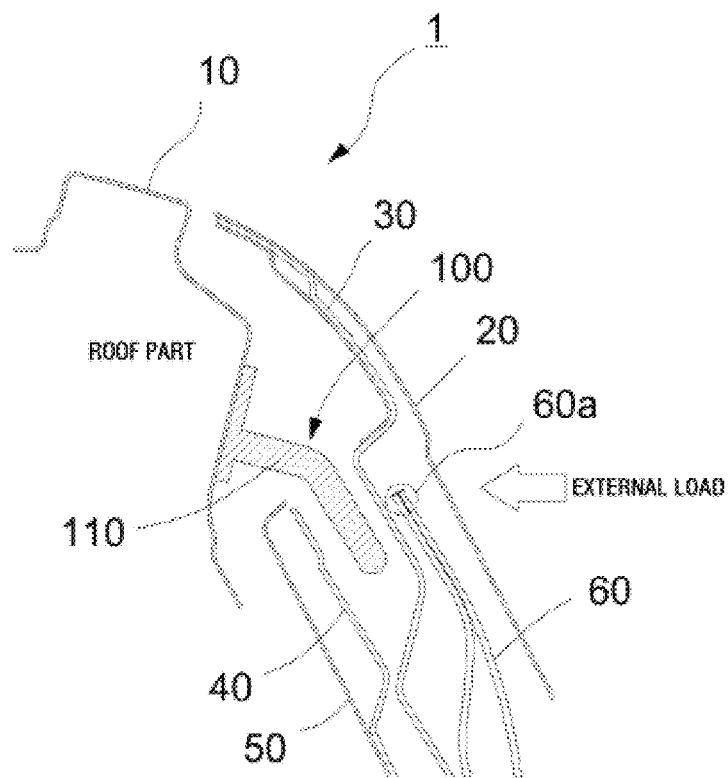
FIG. 5 is a first cross-sectional view of the structure of FIG. 4.

Meanwhile, as illustrated in FIG. 4, the hook no is configured to support door B-pillar rigidity by being fastened to an outer reinforcement 30 and a B-pillar beam compressing portion 60a as the door 1 is deformed and slightly moved inward due to an external impact load such as a collision, as illustrated in FIG. 4B or 5.

Non-described reference numeral 20 is an outer panel, non-described reference numeral 40 is an inner surface of an inner panel, and non-described reference numeral 50 is an outer surface of the inner panel.

Figure 6:
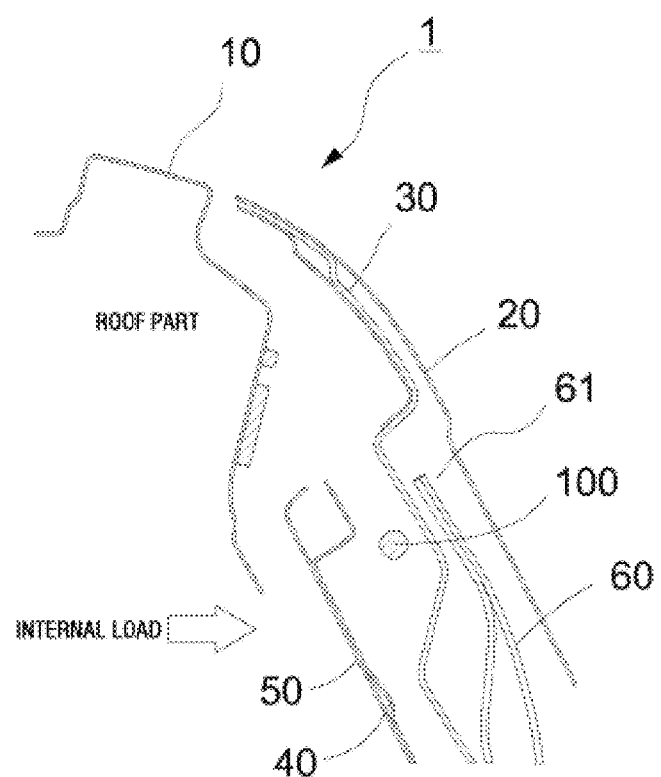
FIG. 6 is a second cross-sectional in of the structure of FIG. 4.

As illustrated in FIG. 6, the hook no is configured to support the door B-pillar rigidity by being fastened by a hook catching structure of an inner reinforcement as the door 1 is slightly deformed and moved outward due to an internal load such as deviation strength or frame rigidity.

Figure 7:
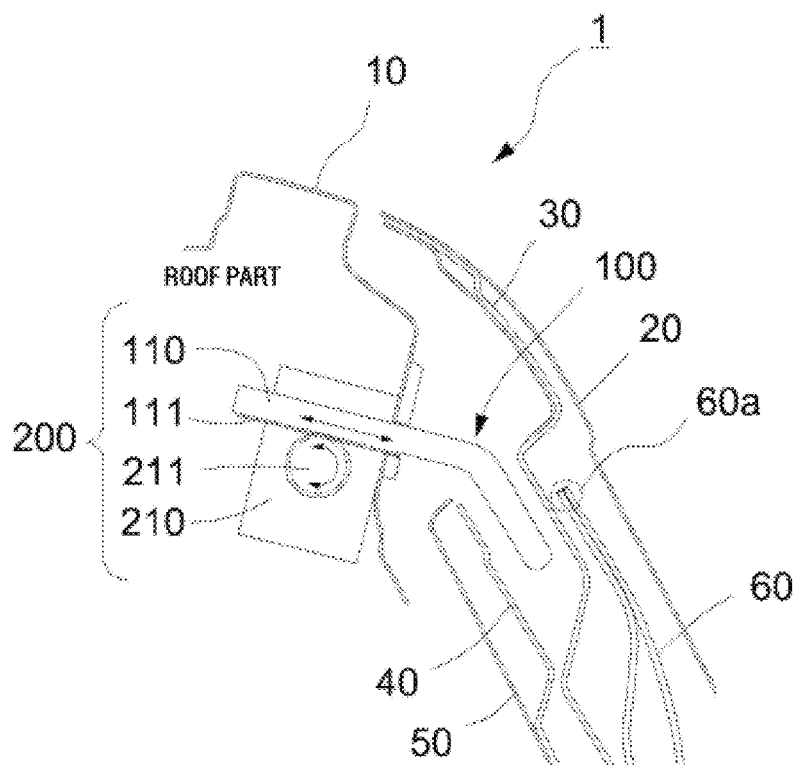
FIG. 7 is a view illustrating a state in which the hook according to the present invention is retracted or extended by a hook retracting/extending mechanism.

FIG. 7 is a view illustrating a state in which the hook according to the present invention is retracted or extended by a hook retracting/extending mechanism. In the present invention, an electric control system (not illustrated) is used to automatically retract or extend the hook from the roof part.

This configuration will be described below with reference to FIG. 7.

A hook retracting/extending mechanism 200 according to the present invention includes an actuator 210 which has a pinion 211, and a rack in which is provided at a lower side of the hook no and engages with the pinion 211 so as to be retracted or extended.

Figure 8A:
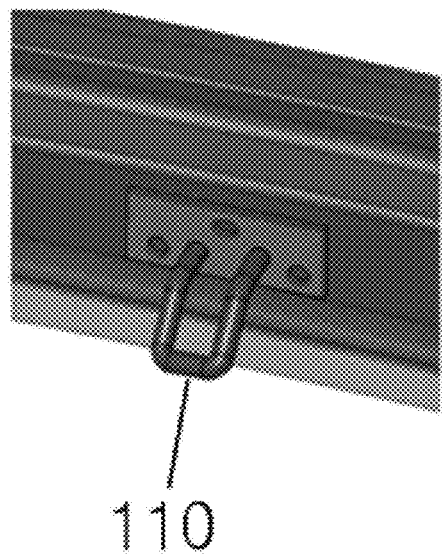
Figure 8B:
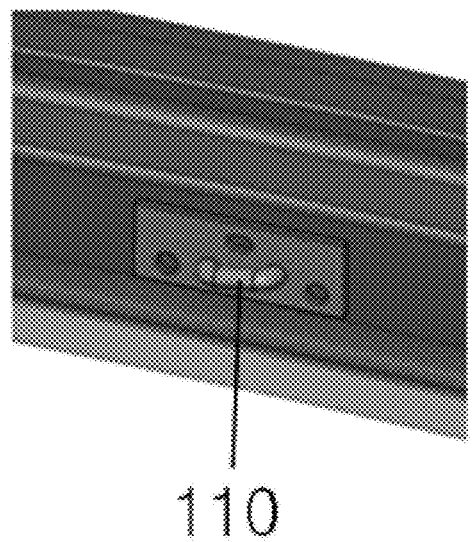

As illustrated in FIG. 8A, with the hook retracting/extending mechanism 200 configured as described above, the hook no is exposed when the sliding door is closed such that the hook no remains exposed while the sliding door is closed, and as illustrated in FIG. 8B, the hook no is inserted into the side outer portion as the sliding door is opened.

Figure 9:
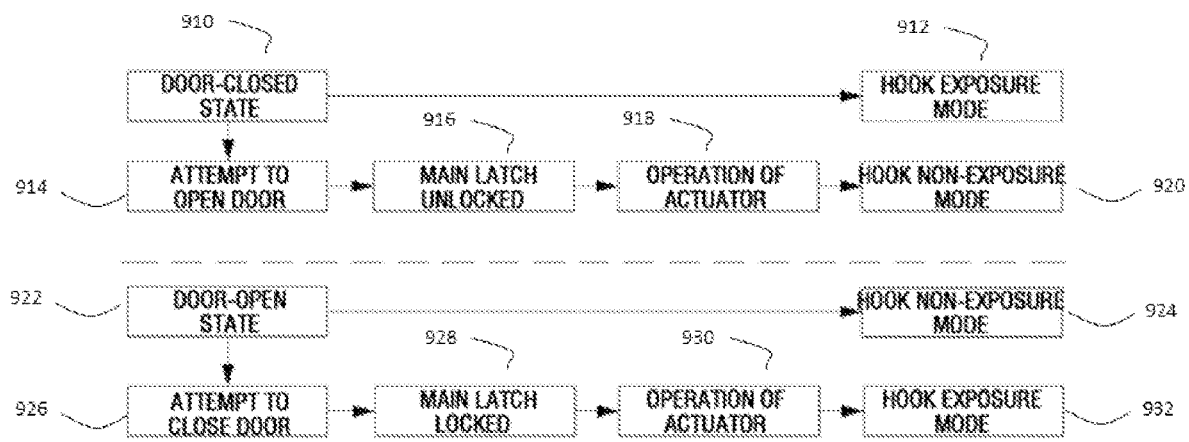
FIG. 9 is a view illustrating operational logic for retracting or extending the hook by using the retracting/extending mechanism according to the present invention.

In more detail, operational logic for retracting or extending the hook no by using the hook retracting/extending mechanism 200 will be described below with reference to FIG. 9.

The hook is in an exposure mode (912) when the door is in a closed state (910).

When the opening of the door is attempted, i.e., a handle is pulled, (914), a main latch (not illustrated) is unlocked (916), and the actuator 210 operates (918) to switch the mode of the hook to a non-exposure mode (920) (see FIG. 8B).

In this case, the hook maintains the non-exposure mode even in a state in which the door is opened.

In this state, when the closing of the door is attempted (926) and the door is open (922), the main latch is locked (928), and the actuator 210 operates (930) to switch the mode of the hook to an exposure mode (932).

Therefore, since the mode of the hook is switched to the non-exposure mode when the door is opened, a protruding shape of an external appearance is reduced to improve high-grade properties and solve a problem caused when a passenger's head is caught and injured when the passenger gets in or out of the vehicle (see FIG. 8A).

The present invention, which has been described above, is not limited by the aforementioned exemplary embodiment and the accompanying drawings, and it will be obvious to those skilled in the art to which the present invention pertains that various substitutions, modifications and alterations may be made without departing from the technical spirit of the present invention.

What is claimed is:

1. An vehicle comprising:
a vehicle body;
a sliding door that can slide forward and rearward in a longitudinal direction of the vehicle body;
a hook installed at a roof part of the vehicle body;
a hook support portion formed at an upper end of a B-pillar beam of the door so that the hook can be caught by or released from the hook support portion;
a hook catching portion that protrudes from an upper portion of the hook support portion so that the hook can be caught by the hook catching portion;
a hook retracting/extending mechanism configured to that the hook is automatically retracted or extended by the hook retracting/extending mechanism as the sliding door is opened or closed, wherein the hook retracting/extending mechanism comprises:
an actuator that has a pinion; and
a rack that is provided at a lower side of the hook and engages with the pinion so as to be retracted or extended.

2. The vehicle of claim 1, wherein the hook retracting/extending mechanism is configured so that the hook is exposed when the sliding door is closed such that the hook remains exposed while the sliding door is closed, and the hook is inserted into a side outer portion as the sliding door is opened.

3. The vehicle of claim 2, wherein the hook retracting/extending mechanism is configured so that the hook maintains an exposure mode when the door is in a closed state, a main latch is unlocked when a door handle is pulled, and the actuator operates to switch a mode of the hook to a non-exposure mode, and the hook maintains the non-exposure mode when the door is in an opened state, the main latch is locked when the door is closed, and the actuator operates to switch the mode of the hook to the exposure mode.

4. The vehicle of claim 1, wherein the hook retracting/extending mechanism is configured so that the hook is exposed when the sliding door is closed.

5. The vehicle of claim 1, wherein the hook retracting/extending mechanism is configured so that the hook is inserted into a side outer portion as the sliding door is opened.

6. The vehicle of claim 1, wherein the hook retracting/extending mechanism is configured so that the hook maintains an exposure mode when the door is in a closed state, a main latch is unlocked when a door handle is pulled, and the actuator operates to switch a mode of the hook to a non-exposure mode, and the hook maintains the non-exposure mode when the door is in an opened state, the main latch is locked when the door is closed, and the actuator operates to switch the mode of the hook to the exposure mode.

7. An vehicle comprising:
a vehicle body;
a sliding door that can slide forward and rearward in the longitudinal direction of the vehicle body;
a hook installed at a roof part of the vehicle body;
a hook support portion formed at an upper end of a B-pillar beam of the door so that the hook can be caught by or released from the hook support portion;
an inner panel and an outer panel wherein the hook support portion is located between the inner panel and the outer panel;
a hook catching portion that protrudes from an upper portion of the hook support portion so that the hook can be caught by the hook catching portion;
a hook retracting/extending mechanism configured to that the hook is automatically retracted or extended by a hook retracting/extending mechanism as the sliding door is opened or closed, wherein the hook retracting/extending mechanism comprises:
an actuator that has a pinion; and
a rack that is provided at a lower side of the hook and engages with the pinion so as to be retracted or extended.

8. The vehicle of claim 7, wherein the hook retracting/extending mechanism is configured so that the hook is exposed when the sliding door is closed such that the hook remains exposed while the sliding door is closed, and the hook is inserted into a side outer portion as the sliding door is opened.

9. The vehicle of claim 8, wherein the hook retracting/extending mechanism is configured so that the hook maintains an exposure mode when the door is in a closed state, a main latch is unlocked when a door handle is pulled, and the actuator operates to switch a mode of the hook to a non-exposure mode, and the hook maintains the non-exposure mode when the door is in an opened state, the main latch is locked when the door is closed, and the actuator operates to switch the mode of the hook to the exposure mode.

10. The vehicle of claim 7, wherein the hook retracting/extending mechanism is configured so that the hook is exposed when the sliding door is closed.

11. The vehicle of claim 7, wherein the hook retracting/extending mechanism is configured so that the hook is inserted into a side outer portion as the sliding door is opened.

12. The vehicle of claim 7, wherein the hook retracting/extending mechanism is configured so that the hook maintains an exposure mode when the door is in a closed state, a main latch is unlocked when a door handle is pulled, and the actuator operates to switch a mode of the hook to a non-exposure mode, and the hook maintains the non-exposure mode when the door is in an opened state, the main latch is locked when the door is closed, and the actuator operates to switch the mode of the hook to the exposure mode.

13. A method of operating a sliding door of a vehicle that comprises:
- a vehicle body, the sliding door attached to the vehicle body so that it that can slide forward and rearward in the longitudinal direction of the vehicle body;
- a hook installed at a roof part of the vehicle body;
- a hook support portion formed at an upper end of a B-pillar beam of the door so that the hook can be caught by or released from the hook support portion;
- a hook catching portion that protrudes from an upper portion of the hook support portion so that the hook can be caught by the hook catching portion;
- a hook retracting/extending mechanism configured to that the hook is automatically retracted or extended by a hook retracting/extending mechanism as the sliding door is opened or closed, wherein the hook retracting/extending mechanism comprises:
  - an actuator that has a pinion; and
  - a rack that is provided at a lower side of the hook and engages with the pinion so as to be retracted or extended wherein the method comprises:
- maintaining the hook in an exposure mode while the door is in a closed state;
- unlocking a main latch when a door handle is pulled;
- operating the actuator to switch a mode of the hook to a non-exposure mode; and
- opening the door to an opened state.

14. The method of claim 13, further comprising:
- maintaining the hook in the non-exposure mode when the door is in the opened state;
- locking the main latch is locked when the door is closed; and
- operating the actuator to switch the mode of the hook to the exposure mode.

* * * * *